United States Patent [19]

Johanson

[11] 4,095,263

[45] June 13, 1978

[54] ADJUSTABLE CAPACITORS

[75] Inventor: John E. Johanson, Boonton, N.J.

[73] Assignee: Johanson Manufacturing Corporation, Boonton, N.J.

[21] Appl. No.: 707,152

[22] Filed: Aug. 31, 1976

[51] Int. Cl.² .................. H01G 5/06; H01G 5/04
[52] U.S. Cl. ............................ 361/292; 361/278; 361/287; 361/293
[58] Field of Search .............. 361/292, 293, 401, 278, 361/287, 299, 294; 334/82

[56] References Cited

U.S. PATENT DOCUMENTS

| | | | |
|---|---|---|---|
| 1,641,635 | 9/1927 | Klein | 361/294 |
| 2,475,144 | 7/1949 | Kodama | 361/293 |
| 3,252,012 | 7/1966 | Brown | 361/292 X |
| 3,486,089 | 12/1969 | Wambach | 361/293 |
| 3,530,411 | 9/1970 | Sear | 361/401 X |
| 3,701,932 | 10/1972 | Johanson | 261/299 |

Primary Examiner—Elliot A. Goldberg
Attorney, Agent, or Firm—James J. Cannon, Jr.; James J. Cannon

[57] ABSTRACT

Adjustable capacitors for incorporation with any substrate design, and for other general or specific capacitor uses, comprising a dielectric housing means, having base and sidewall eminating therefrom, a rotatable rotor (within said housing means), constructed from a highly conductive metal, having a cylindrical hub and at least one contoured blade plate emanating from the base of said hub, and a metallic retainer, coaxial with and encompassing said rotor hub, to captivate itself against said sidewall in a convex-concave relation to cover and to seal said capacitor assembly and to abut the inner portions of said blade plates to uniformly distribute plate pressure upon the active surface of said dielectric housing base. Displaced from the rotor blade plate by the dielectric housing base are contoured conductive metallized receptive stator electrode layers deposited upon or within said base for connection with receptive substrate circuitry. Thus, simplicity of design results in only three basic parts, the dielectric housing means, the rotor and the retainer.

10 Claims, 10 Drawing Figures

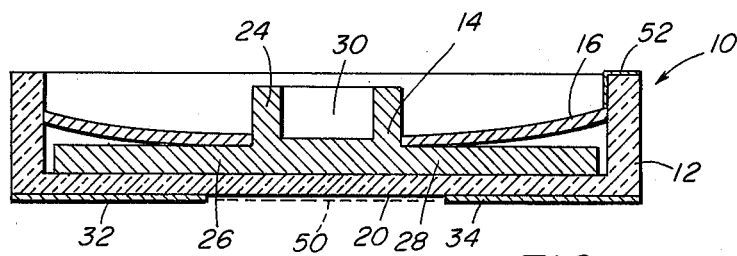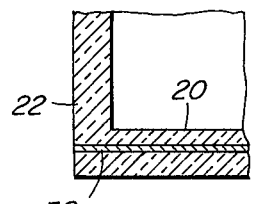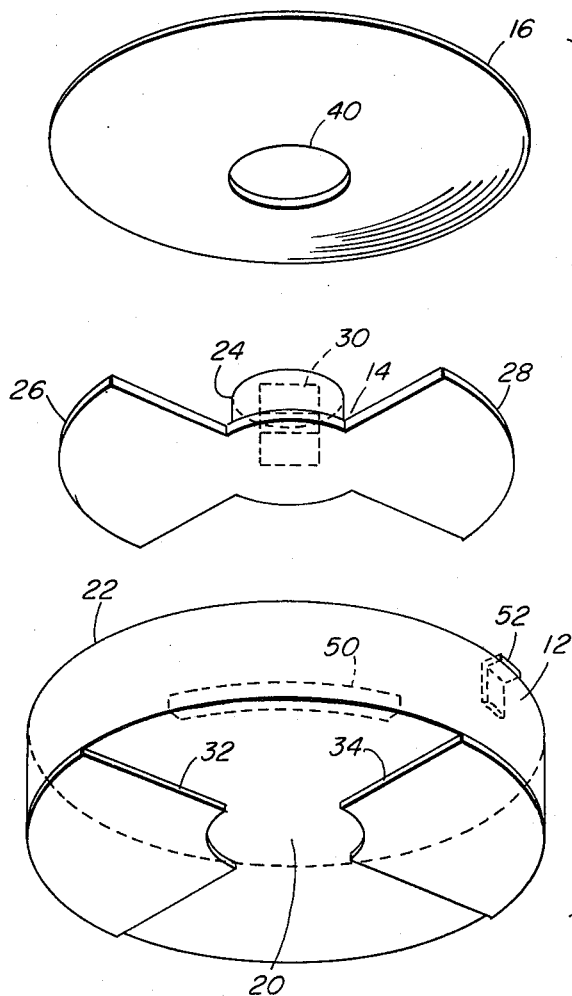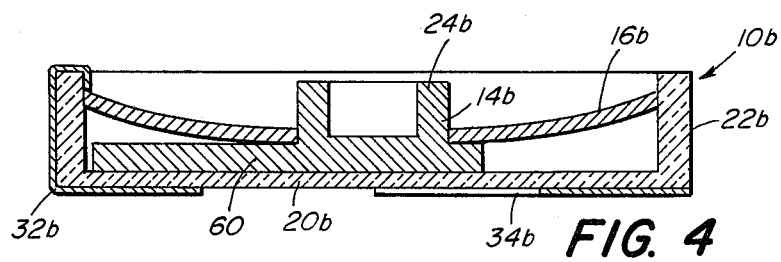

ADJUSTABLE CAPACITORS

BACKGROUND OF THE INVENTION

The present invention relates to variable or adjustable capacitors and particularly to improvements in the structure of adjustable capacitors, for incorporation with various substrate designs and for other general or specific capacitor uses. Simplicity of design results in only three parts, a dielectric housing, a rotor and a retainer. While useful for incorporation in micro-miniature circuitry, the capacitor is useful and inexpensive for any substrate design.

DESCRIPTION OF THE PRIOR ART

The invention hereinafter disclosed is primarily an improvement of the construction concepts of adjustable capacitors as disclosed by the present inventor in U.S. Pat. No. 3,701,932. Obviously, objects of the invention include compactness of structure, reliability in performance and low cost of manufacture. The present invention is reduced in size and complexity when compared with the above-cited patent and is superior in performance thereto. The capacitor may be readily incorporated into any circuit substrate.

Performance is improved due to a reduction of the number of component parts which, in turn, reduces the chance of mechanical failure. The invention is also less susceptible to damage by vibration or physical shock over long periods because of the simplified construction. For example, the clamping means of the above-cited application and its connections to the assembly have been replaced by a unitary dielectric housing and a retainer cover thus lessening the number of component parts paths of vibration transmission therethrough. The stator plates have been replaced by incorporating conducting plate layers on or within the bottom of the base of the dielectric housing thus creating a more compact assembly. Due to the simplicity of construction and the minimal number of members, manufacture of the assembly is comparatively easier and the chance of component failure reduced. The structural integrity therefore enhances the reliability of circuits. An alternative embodiment is disclosed in which a portion of a substrate serves as the dielectric housing, thus further simplifying the design. All embodiments allow for extremely fine adjustable tuning capabilities and the capacitor may be grounded internally; nor does the invention require any extraneous insulating material.

SUMMARY OF THE INVENTION

The present invention is adapted to be integrated into any style of substrate circuitry such as a co-planar mounting across or between gaps and permits either series or shunt gap tuning to the desired levels of capacitance. The invention will have particular application for the overall reduction of product size, especially within the digital watch industry, and will have multifarious applications within electronic products which incorporate the use of substrate design circuitry.

The present invention is comprised of three basic components: a dielectric housing means, a highly conductive rotor having extending blade plates, and a covering retainer to maintain the rotor within the dielectric housing means. The design permits rotation of the rotor to adjust capacitance. The retainer, when assembled by special assembly techniques, seals the rotor hub and applies a downward pressure against the rotor blade, causing the rotor blade to contact the active surface of the dielectric with a uniformly distributed pressure. The retainer also centralizes the rotor for a positive concentric rotation. In an alternative embodiment, a portion of a larger, circuit substrate may serve as the dielectric housing by the insertion of the rotor and retainer in a recessed area of the substrate.

The assembly further has, incorporated upon or within the dielectric housing means base, metallized layers contoured to complement the shape of the rotor blade plates with respect to the desired capacitance range to be produced. A highly conductive metallic coating may be applied to the base of the housing means to complete the electrical path.

Various alternative embodiments are contemplated to allow variance of capacitance ranges and ultimate usages which may be most easily accomplished primarily by varying the configuration or periphery contour of the rotor blade plates and the configuration or periphery contour of the metallized layers. The outside periphery of the housing means, while shown as a circle, may be any multi-sided contour, such as an octagonal shape. A multi-sided design facilitates the orientation of the capacitor for assembly purposes and for the application of metallic coatings. Also, if the metallized layers are incorporated in a recessed portion of the substrate, the rotor and retainer may simply be placed in the recess with the substrate acting as the dielectric housing means.

BRIEF DESCRIPTION OF THE DRAWINGS

FIG. 1 is a vertical cross-sectional view of the adjustable capacitor of the present invention.

FIG. 2 is an exploded view in perspective of the adjustable capacitor illustrated in FIG. 1.

FIG. 3 illustrates an isolated cross-sectional view of a capacitor embodiment having the metallized layer stator electrode portion incorporated within the dielectric housing means base of the capacitor of FIG. 1.

FIG. 4 is a vertical cross-sectional view of an alternative embodiment of the invention of FIG. 1 illustrating a grounded adjustable capacitor.

DESCRIPTION OF THE DRAWINGS

Figure 5:
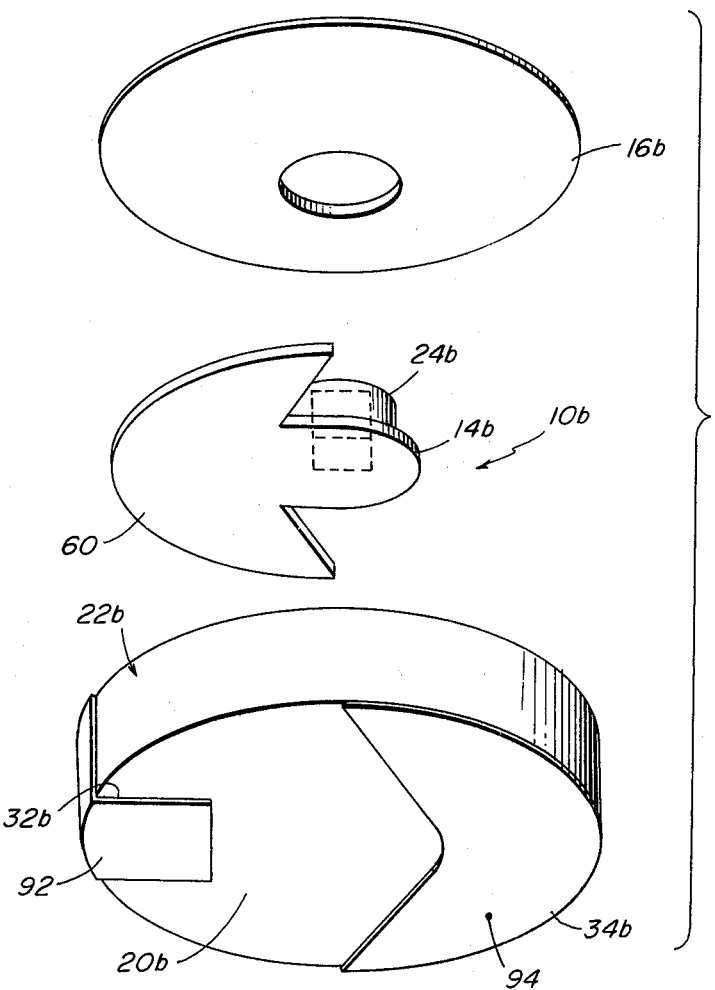
FIG. 5 illustrates the contours of the rotor blade plate and metallized layer electrode of the adjustable capacitor embodiment of FIG. 4.

Referring now to the drawings in detail and in particular to both FIGS. 1 and 2, the adjustable capacitor of the present invention is generally designated by the reference numeral 10. This adjustable capacitor is designed for incorporation with any substrate design and for any other general or specific capacitor uses. The major components of capacitor 10 consist of housing means 12, being of a dielectric material, rotor 14 positioned within housing means 12, being of a highly conductive material, and a retainer 16, being of a metallic material, to cover and secure capacitor assembly 10. FIG. 2 further illustrates the coaxial stacked configuration of the components.

In the embodiment illustrated, housing means 12 is formed to have a flat base 20 from which, at its periphery, perpendicular sidewall 22 emanates. Housing means 12 will be placed with base 20 upon a substrate and resemble an inverted cap. It is desired that housing means 12 have a dielectric constant characteristic and may be made from any suitable dielectric material including ceramic. The thickness of housing means base 20 may be varied to enlarge or lessen the discharge distance between electrodes to produce a lower or higher hield of capacity. The selected dielectric material, in order to yield a predetermined capacity, may have a dielectric constant ranging from approximately 10K to higher than 300K.

While the outside periphery of housing means 12 is illustrated as circular or cylindrical in shape, this design shape may be replaced by any multi-sided contour such as an octagonal design. A multi-sided housing means will facilitate the orientation of the capacitor for assembly purposes and for the application of metallic coatings.

Rotor 14 has a concentric cylindrical hub post 24. Emanating from the base of hub 24 are two thin electrode plates 26 and 28, spaced 180° apart at their central axis, in the configuration of annular segments, i.e., a butterfly configuration. It should be noted that rotor electrode plates 26 and 28 do not extend to and communicate with sidewall 22, there being a slight clearance distance. The upper end portion or rotor hub 24 is provided with a square hole or recess 30 which provides the means of adjustment of capacitor 10. A screwdriver-like dielectric tool having a complementing square bit is inserted into recess 30 for turning rotor 14 with respect to the remainder of capacitor 10 and thereby varying or adjusting capacitance. Rotor member 14 will preferably be constructed from coined silver or other similar coinable, highly conductive materials.

Dielectric housing means base 20, of the embodiment of FIGS. 1 and 2, has two metallized layered stator electrode areas 32 and 34 deposited upon its outer bottom surface which remain in a fixed position. The metallized layers are a highly conductive metal, preferably silver. Metallized portions 32 and 34 conform to the annular segmented "butterfly" configuration of rotor electrode plates 26 and 28 and are spaced 180° apart at their central axis. The metallized layers extend from the periphery of housing means base 20 to a point some distance short of the central circular area of the dielectric housing means base upon which rotor hub 24 rests. Thus when rotor 14 is moved, rotor plates 26 and 28 will be gradually moved rotatively with respect to registering metallized stator electrode plate layers 32 and 34 to correspondingly vary capacitance.

Rotor 14 is maintained in its position by retainer 16. Retainer 16 is a washer-like circular thin piece of somewhat bendable metal and has a centrally disposed annular bore 40. Bore 40 has a diameter which will allow rotor hub 24 to pass therethrough and form a snug fit but not a fit which unduly restrains the rotation of rotor 14. The secure fitting is accomplished by the fact that retainer 16 has a diameter slightly greater than the inner diameter of housing means sidewall 22. Retainer 16, when positioned, exerts outward pressure to captivate itself about the interior of sidewall 22 at a point slightly below the upper extent of sidewall 22 and exerts downward pressure to form a seal about the base of rotor hub 24 and to abut the upper surface of the inner portions of rotor blade plate annular seqments 26 and 28. The surfaces of retainer 16 are in essence in a concave-convex relation. The opposing inward and outward forces about the inner and outer peripheries of retainer 16 assure structural integrity and a reliable electrical connection. The retainer, in applying a downward pressure against rotor blade plates 26 and 28, causes said blades to contact the active surface of the dielectric with a uniformly distributed pressure. Retainer 16 also centralizes rotor 14 for a positive concentric rotation since the edges of plate blades 26 and 28 do not communicate with, are displaced from and are not guided by housing means sidewall 22.

As illustrated in FIG. 3 by an isolated cross-sectional view of the stator electrode portion of dielectric housing means base 20, by means of monolithic construction, annular segmented conductive metallized layers, of which layer 32a is an example, may be incorporated within dielectric housing base 20. This provides a smaller dielectric path which results in a higher capacitance while the thickness of housing means base 20 is maintained for strength and structural integrity. The metallized layers may then extend downward on the outer portion of sidewall 22 to provide adequate means for connection to the substrate circuit in which the capacitor 10 will be imbedded.

Returning now to FIGS. 1 and 2, an alternative embodiment whereby capacitor 10, as herein before described, is constructed as follows to be internally grounded. A thin metallized strip layer 50 upon a small portion of the periphery of dielectric housing means base 20 and extending for a slight portion up housing means sidewall 22 connects to metallized electrode layers 32 and 34. A thin metallized strip 52 adheres to the lip of sidewall to and extends down the interior surface of sidewall 22 of connect and communicate with retainer 16. This construction results in a higher capacity yield when connected to the appropriate circuitry.

The disclosure of FIGS. 1, 2, and 3 therefore presents a series type adjustable capacitor with rotatable rotor blade electrodes. The substrate connections will be between metallized layers 32 and 34 and a complementary receiving substrate. Preferably capacitor 10 will be embedded within the substrate (not illustrated) but may rest upon the substrate.

FIGS. 4 and 5 represent a grounded type of adjustable capacitor 10b which yields a greater capacity range than adjustable capacitor 10 of FIGS. 1 and 2. The basic structural components of adjustable grounded capacitor 10b are identical to the structure of FIGS. 1 and 2 in that housing means 12b encompasses rotor 14b which is rotatably secured in its position by retainer 16b.

The major distinctive features of capacitor 10b are the contours of the single rotor blade plate 60 and the contours of the metallized stator electrode layers. It should be noted that only one rotor blade is utilized. Rotor blade plate 60 has a rounded outer periphery and an indented parabolic inner periphery, the apex of the inner periphery being defined by the communication with rotor hub 24b. In essence rotor blade plate 60 encompasses a span of 180° as compared with the approximately 90° span of each of rotor plate blades 26 and 28 of capacitor 10 of FIGS. 1 and 2.

Metallized stator electrode layer 34b, upon the bottom surface of dielectric housing means base 20b, has a rounded outer periphery conforming to the outer periphery of base 20b.

The inner periphery of metallized layer 34b is of an indented parabolic nature corresponding to the parabolic arc of blade 60 and further encompassing a 180° segment. It is again important that metallized layer 34b be recessed from the area of rotor hub 24b so no electrical charge will pass between the same.

Metallized layer 32b is applied to the bottom surface of housing means base 20b and is of a relatively narrow rectangular shape. Layer 32b is positioned upon the line of symmetry of opposing metallized electrode layer 34b. Metallized stator electrode layer 32b is extended to and applied upon the outer surface of housing means sidewall 22b, over the sidewall lip and on the inner surface of sidewall 22b to connect dielectric housing means base 20b to the periphery of retainer 16b (FIG. 4). This connection grounds rotor 14b by means of conduction through metal retainer 16b. Connection to a substrate may be made through metallized layers 32b, 34b.

Figure 6:
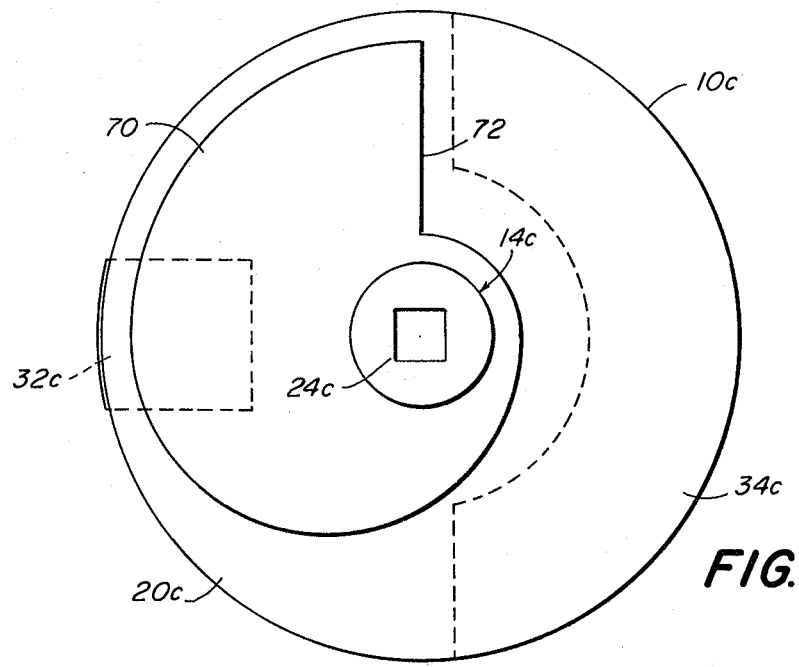
FIG. 6 illustrates alternative contours of the rotor blade plate and metallized layer electrode of the adjustable capacitor embodiment of FIG. 4.

FIG. 6, capacitor 10c, primarily illustrates an alternative rotor design for grounded adjustable capacitor 10b of FIGS. 4 and 5. The contour of rotor blade 70 is a plotted curve design, such as the involute of a circle or a logarithmic spiral having rotor hub 24c being the point of origin and having a straight edge 72, at the widest extent, so in essence to only occupy 180° of capacitor housing means base area 20c. Metallized stator electrode layer circular segment 34c, complimentarily embodied about the outer periphery of base 20c to accommodate the rotation of rotor blade 70, has a circular inner periphery which is some distance from the housing means base area covered by hub 24c of rotor 14c. Metallized circular segment layer 34c encompasses approximately a 165° span upon the bottom surface of housing means base 20c. As in FIGS. 4 and 5 metallized electrode layers 32c and 34c provide the substrate connection. Metallized electrode layer strip 32c will extend up sidewall 22c, over the sidewall lip and down the inner surface of sidewall 22c to join dielectric base 20c to retainer 16c to ground the capacitor as disclosed in FIGS. 4 and 5.

The unique contour of rotor blade 70 permits a gradual entry into the metallized stator area. This produces a finer tuning capability over the entire tuning range of capacitor 10c than with other embodiments previously described.

Figure 8:
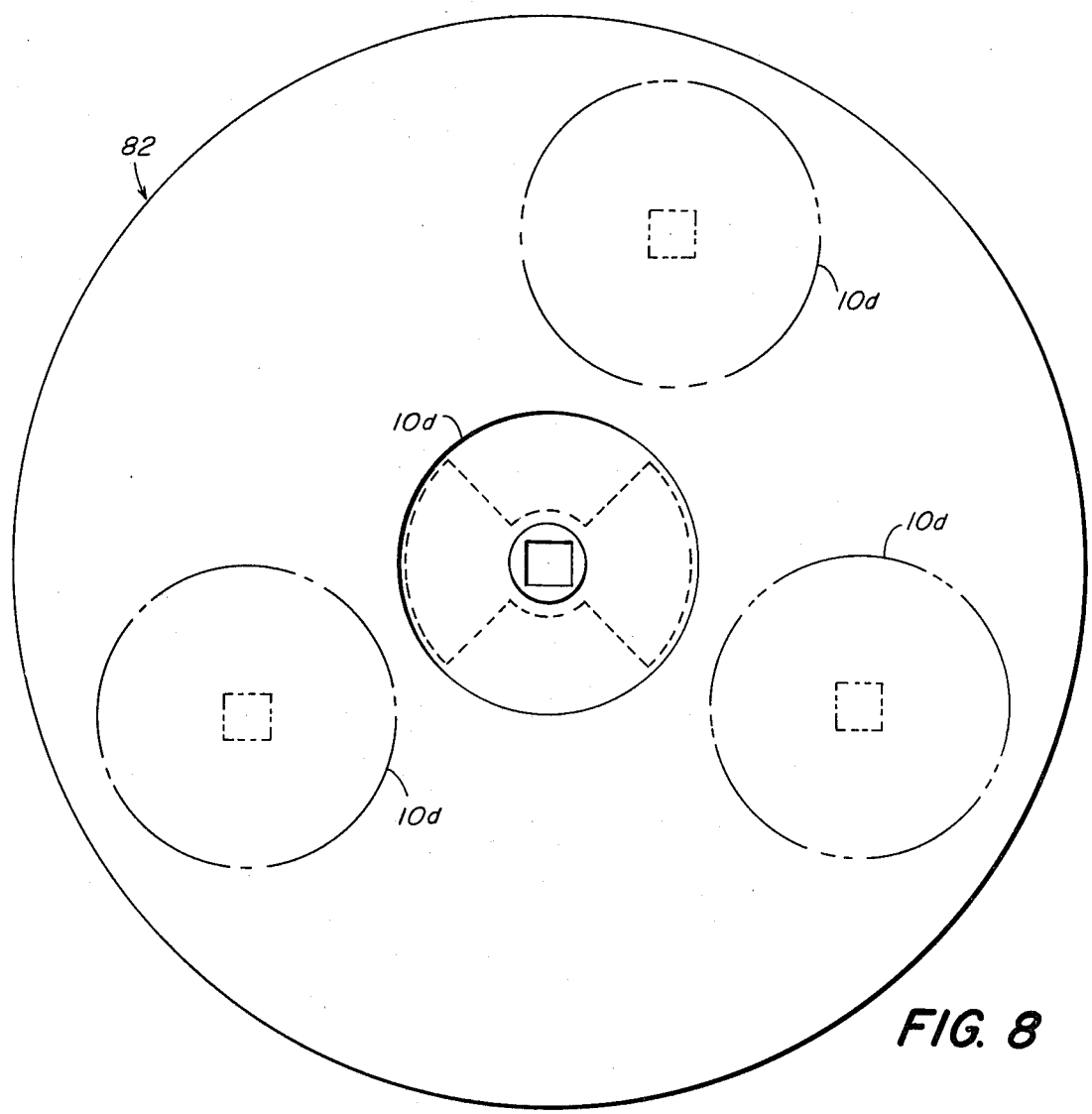
FIG. 8 is a top view of a substrate showing the capacitor of FIG. 7 embedded therein.
Figure 7:
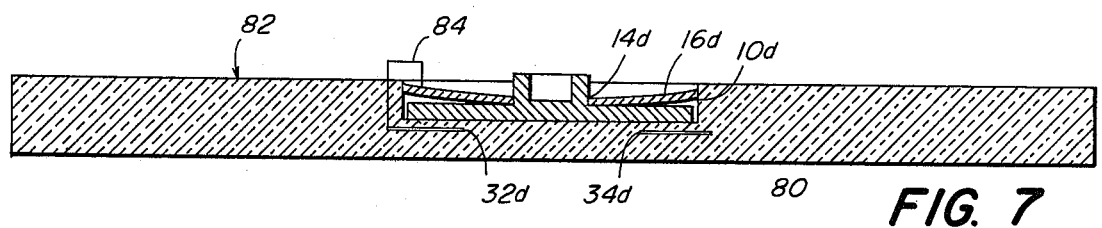
FIG. 7 illustrates a two component adjustable capacitor, utilizing the principles of the present invention, embedded and incorporated as an integral part of a substrate circuit design, the substrate forming the dielectric housing means.

As previously mentioned, the adjustable capacitor of the present invention may be incorporated into any electronic product incorporating the use of substrate designs. FIGS. 7 and 8 illustrate an alternative to securing the capacitor embodiments of the previous figures to a substrate by disclosing a two piece adjustable capacitor 10d as an integral part of the substrate design in conformance with the foregoing principles. Rotor 14d and retainer 16d are positioned within an indented blind hole 80 in substrate 82, substrate 82 serving the function of the dielectric housing means of all previous figures. Appropriate stator electrodes 32d and 34d are embedded within substrate 82 through monolithic construction. All areas of substrate 82 surrounding adjustable capacitor 10d contain the integrated circuitry functional to the built-in capacitor. A plurality of capacitors could be placed on a substrate in this way as illustrated in FIG. 8 which illustrates the rotor embodiment of FIGS. 1 and 2. In one embodiment, substrate 82 need only be 0.030 inches thick, and, for example, the diameter of substrate 82 needed to accommodate the various illustrated adjustable capacitors is only 0.718 inches. These dimensions can be greater or less within the scope of the invention.

It is contemplated by the inventor that this alternative, essentially a two-piece embodiment will find greater usage in the relevant art than the previously described embodiments due to the space savings inherent thereto. Accordingly, all principles and alternative embodiments, i.e. blade configurations, will be applicable to the embodiments of FIGS. 7 and 8. Thus a plurality of embedded capacitors could be placed in one area or in various areas of substrate 82 to interact with appropriate embedded electrodes properly connected and grounded with the appropriate circuitry to retainer 16d. As in all previous embodiments the embodiment of FIGS. 7 and 8 will deliver a capacitance level dependent upon the design of the rotor blade plates and stator electrode plates, the discharge distance through the dielectric and whether or not the capacitor is grounded.

Figure 9:
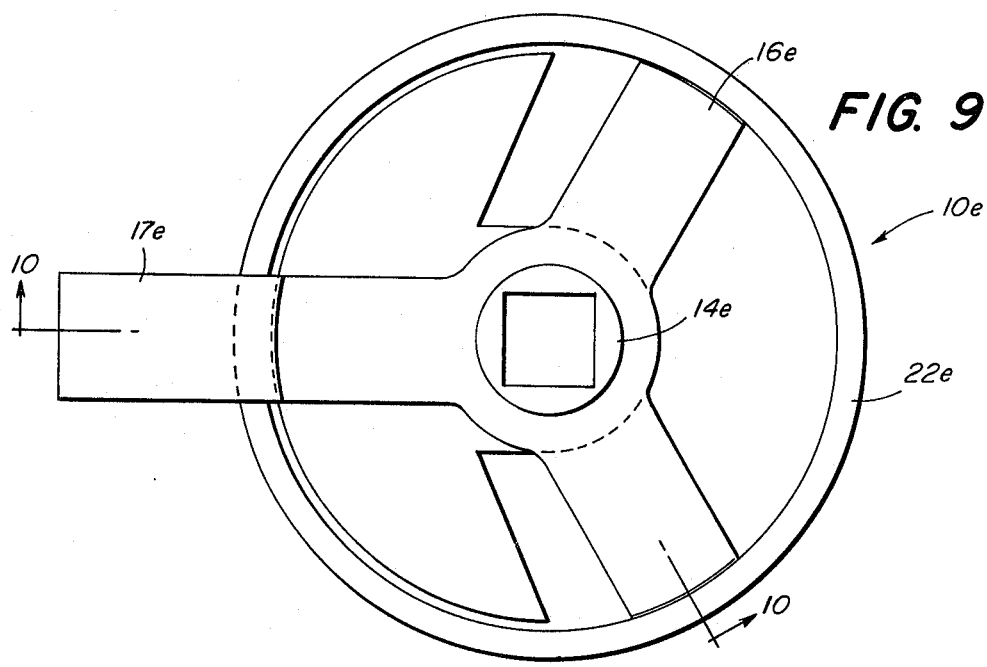
FIG. 9 illustrates an alternative embodiment of the capacitor of FIGS. 5 and 6.
Figure 10:
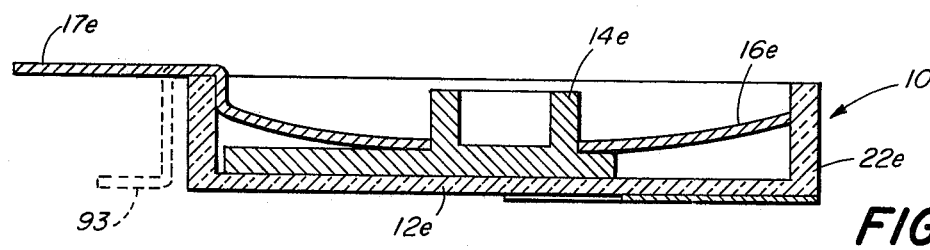
FIG. 10 illustrates a vertical cross-section of the capacitor of FIG. 9.

FIGS. 9 and 10 illustrate an alternative embodiment of the capacitor of FIGS. 5 and 6. In capacitor 10e of FIGS. 9 and 10 retainer 16e is formed to captivate itself at three or more points on the periphery of side housing wall 22e. Retainer 16e allows free rotation of the rotor 14e while holding rotor 14e concentric to the inside diameter of housing means 12e. An integral part of retainer 16e is the extension 17e which serves as an external terminal for an electrical connection. Extension 17e may be formed in various configurations to permit it to be connected to adjoining circuitry. A typical configuration is shown in dotted lines at reference numeral 93. Connections to the substrate normally occur at positions 92 and 94 on FIG. 5. For special terminal configurations, electrical connections may be made at points 17e or 93.

All embodiments illustrated in FIGS. 1 through 10 inclusive are shown with a circular or cylindrical housing means for convenience. However, the periphery of the housing wall may have any multi-sided contour, such as an octagonal shape. A multi-sided contour facilitates the orientation of the capacitor for assembly purposes and for the application of the metallic coatings.

Additionally, the sides of the housing means and its base could be of different materials.

The inventor does not wish to be strictly limited to the foregoing embodiments as many variations of the present invention may be made without departing from the spirit of the disclosure. The present invention, as was disclosed in the variable capacitor of U.S. Pat. No. 3,701,932, may be coaxially placed one on top of the other in a stacked relation if a particular application requires such. Therefore the inventor wishes to be limited only by the scope and spirit of the following claims.

I claim:

1. An adjustable capacitor comprising:
   a unitary dielectric housing means having a base and a sidewall emanating therefrom, said housing means integrally fabricated from a material having specific dielectric characteristics, and serving as a dielectric for said capacitor;
   an electrically conductive rotor member placed within said housing, said rotor member having a central hub and at least one thin blade plate member emanating perpendicularly from the base of said hub to communicate with the inner dielectric surface of said housing base, the outer extent of said blade plate terminating short of abutting said housing means sidewall;

a bendable metal retainer member having a dimension slightly greater than the inner dimensions of said dielectric housing means sidewall and having centrally disposed bore circumscribing said rotor hub such that said retainer captivates itself in a spring-like manner within said housing means sidewall, its surface being in a convex-concave relation to exert inward and outward pressure to seal said capacitor assembly about said sidewall and about said rotor hub and to exert downward pressure upon said rotor blade plate member; and a recess within the upper end portion of said hub to provide means of adjustment;

at least one metalized electrode layer secured to the lower side of the base of said dielectric housing base to complete the dielectric path and to afford means of connection to circuitry, said metalized layer extending to the periphery of said housing means base and said metalized electrode layer serving as a stator.

2. The adjustable capacitor of claim 1 further comprising:

a second rotor blade plate emanating perpendicularly from the base of said hub such that said two rotor blade plates are in an annular segmented butterfly configuration, said blades being spaced 180° apart at their central axis;

a second metalized stator electrode layer secured to the lower side of said housing means base, said two metalized electrode layers being in a complementary annular segmented butterfly configuration to that of said rotor blades and extending to the edge of said housing base and communicating with said circuitry.

3. The adjustable capacitor of claim 2 further comprising;

an elongated metalized strip layer deposited about the periphery of said housing base and sidewall positioned relatively between said annular segmented metalized stator electrodes; and a second thin metalized strip layer deposited upon the lip of said sidewall and extending vertically inward and downward to connect and communicate with said retainer.

4. The adjustable capacitor of claim 1 further including:

said rotor blade plate having a rounded outer periphery and an indented parabolic inner periphery, the apex of said inner periphery being defined by said blade plate communication with said rotor hub;

said metalized stator electrode layer having an inner parabolic periphery corresponding to the parabolic arc of said rotor blade plate with means for connection to a circuit;

a second metalized electrode layer being of a rectangular configuration, approximately 180° from said first stator electrode with means for connection to a circuit; and said second metalized layer extending and being deposited upon said sidewall outer surface, over the sidewall lip and upon the inner surface of said sidewall to connect and communicate with said retainer.

5. The adjustable capacitor of claim 1 further including;

said rotor blade plate having a plotted curve design such as the involute of a circle, said rotor hub being the point of origin and having one straight edge at its widest extent from the outer periphery to said rotor hub so to occupy an area of approximately 180°;

said metalized stator electrode layer having a circular inner periphery with squared inner edges, the inner periphery some distance from said rotor hub area, with means for connection to a circuit;

a second metalized electrode layer of a rectangular configuration, approximately 180° from said first electrode layer, with means for grounded rotor connection to circuitry; and said second metalized layer extending and being deposited upon said sidewall outer surface over the sidewall lip and upon the inner surface of said sidewall to connect and communicate with said retainer.

6. An adjustable capacitor comprising:

a unitary dielectric housing means having a base and a sidewall emanating therefrom, said housing means integrally fabricated from a material having specific dielectric characteristics, and serving as a dielectric for said capacitor;

an electrically conductive rotor member placed within said housing, said rotor member having a central hub and at least one thin blade plate member emanating perpendicularly from the base of said hub to communicate with the inner dielectric surface of said housing base, the outer extent of said blade plate terminating short of abutting said housing means sidewall;

a bendable metal retainer member having a dimension slightly greater than the inner dimensions of said dielectric housing means sidewall and having a centrally disposed bore circumscribing said rotor hub that said retainer captivates itself in a spring-like manner within said housing means sidewall, its surface being in a convex-concave relation to exert inward and outward pressure to seal said capacitor assembly about said sidewall and about said rotor hub and to exert downward pressure upon said rotor blade plate member; and a recess within the upper end portion of said hub to provide means of adjustment:

at least one metalized electrode layer embedded within the base of said dielectric housing to complete the dielectric path and to afford means of connection to circuitry, said metalized layer layer extending to the periphery of said housing means base and said metalized electrode layer serving as a stator.

7. The adjustable capacitor of claim 6 further comprising;

a second rotor blade plate emanating perpendicularly from the base of said hub such that said two rotor blade plates are in an annular segmented butterfly configuration, said blades being spaced 180° apart at their central axis;

a second metalized stator electrode layer embedded within said housing means base said two metalized electrode layers being in a complementary annular segmented butterfly configuration to that of said rotor blades and extending to the edge of said housing base and communicating with said circuitry.

8. The adjustable capacitor of claim 7 further comprising;

an elongated metalized strip layer deposited about the periphery of said housing base and sidewall positioned relatively between said annular segmented metalized stator electrodes; and a second thin metalized strip layer deposited upon the lip of said sidewall and extending vertically inward and downward to connect and communicate with said retainer.

9. The adjustable capacitor of claim 6 further including:

said rotor blade plate having a rounded outer periphery and an indented parabolic inner periphery, the apex of said inner periphery being defined by said blade plate communication with said rotor hub;

said metalized stator electrode layer having an inner parabolic periphery corresponding to the parabolic arc of said rotor blade plate with means for connection to a circuit;

a second metalized electrode layer being of a rectangular configuration, approximately 180° from said first stator electrode with means for connection to a circuit; and said second metallized layer extending and being deposited upon said sidewall outer surface, over the sidewall lip and upon the inner surface of said sidewall to connect and communicate with said retainer.

10. The adjustable capacitor of claim 6 further including:

said rotor blade plate having a plotted curve design such as the involute of a circle, said rotor hub being the point of origin and having one straight edge at its widest extent from the outer periphery to said rotor hub so to occupy an area of approximately 180°;

said metalized stator electrode embedded layer having a circular inner periphery with squared inner edges, the inner periphery some distance from said rotor hub area, with means for connection to a circuit;

a second metalized electrode layer of a rectangular configuration approximately 180° from said first electrode layer, with means for grounded rotor connection to circuitry; and said second metalized layer extending and being deposited upon said sidewall outer surface over the sidewall lip and upon the inner surface of said sidewall to connect and communicate with said retainer.

* * * * *